US005519507A

United States Patent [19]

Subramaniam et al.

[11] Patent Number: 5,519,507
[45] Date of Patent: May 21, 1996

[54] BATCHING AND DELAYED TRANSMISSION OF FACSIMILES

[75] Inventors: Jason Subramaniam, Fremont; Laszlo Leirer, San Jose; Shahryar Soroosh, Saratoga; Yigal Brandman, Palo Alto, all of Calif.

[73] Assignee: Octel Communications Corp., Milpitas, Calif.

[21] Appl. No.: 407,263

[22] Filed: Mar. 20, 1995

Related U.S. Application Data

[63] Continuation of Ser. No. 173,622, Dec. 22, 1993.

[51] Int. Cl.$^6$ .............................. H04N 1/21; H04N 1/32
[52] U.S. Cl. ........................ 358/402; 358/407; 358/444
[58] Field of Search .................................. 358/402, 407, 358/444; 379/100

[56] References Cited

U.S. PATENT DOCUMENTS

| | | | |
|---|---|---|---|
| 4,646,160 | 2/1987 | Iizuka et al. | 358/402 |
| 4,994,926 | 2/1991 | Gordon et al. | 358/402 |
| 5,018,191 | 5/1991 | Catron et al. | 379/100 |
| 5,033,079 | 7/1991 | Catron et al. | 379/100 |
| 5,291,302 | 3/1994 | Gordon et al. | 358/402 |
| 5,459,584 | 10/1995 | Gordon et al. | 358/402 |

*Primary Examiner*—Scott A. Rogers
*Attorney, Agent, or Firm*—Carr, DeFilippo & Ferrell

[57] ABSTRACT

An apparatus and method are described in a voice mail system for selectively storing faxes in a batch mailbox prior to printing at a facsimile machine in order to efficiently utilize the telephone connection between the voice mail system and the facsimile machine. The apparatus comprises a plurality of electronic mailboxes for the storage of facsimiles, a facsimile machine for receiving and printing facsimiles from the plurality of mailboxes, and a batch mailbox connected between the plurality of mailboxes and the facsimile for receiving and buffering the stored facsimiles and for sequentially transmitting the buffered facsimiles to the facsimile machine for printing. Facsimiles can be added to the batch mailbox during the printing of other facsimiles in the batch mailbox.

26 Claims, 12 Drawing Sheets

BATCHING AND DELAYED TRANSMISSION OF FACSIMILES

RELATED APPLICATIONS

This is a continuation of copending application Ser. No. 08/173,622 filed on Dec. 22, 1993.

BACKGROUND OF THE INVENTION

1. Field of the Invention

This invention relates to computer software and voice mail systems used in telephone communications and more particularly to an apparatus and method for storing, retrieving, and transmitting facsimiles.

2. Description of the Background Art

A recent advance in business telephone communications has been the addition of voice mail systems to business telephone systems. A voice mail system can answer incoming telephone calls, record incoming telephone messages, and direct such messages to the appropriate mailboxes. Users can review messages at their convenience. Voice mail also allows users to prepare messages, to store messages, and to send identical messages to multiple destinations at different times. A user may store a message for later transmission or for transmission with other messages. Voice mail is a general voice message manager and has become a standard feature of business offices.

Also of increasing importance to businesses is the facsimile machine. Facsimile machines transmit documents, also known as faxes, over telephone lines to a receiving facsimile machine. A facsimile machine can both send and receive faxes. When a facsimile machine transmits a fax, it dials the telephone number of the destination facsimile machine, establishes a telephone line, transmits the fax, and disconnects the telephone line. The facsimile machine performs these steps for each fax that it transmits. When a facsimile machine receives a fax, it prints the fax simultaneously with its reception. The facsimile machine generally has only limited memory to store faxes.

The increased use of facsimile machines raises issues of privacy and confidentiality. In most businesses a small number of facsimile machines serve a large number of employees. Unless the recipient of the fax has a personal facsimile machine to which no other person has access, the intended recipient's incoming faxes will not be private. Furthermore, if the recipient is not at the location of the receiving facsimile machine, the faxes are not available until the faxes are picked up or delivered.

One drawback of storing and sending faxes from a voice mail system to a facsimile machine is the inefficiencies associated with connecting to a phone line, transmitting the fax, and disconnecting from the facsimile machine, each time a fax is to be printed. What is needed is a voice mail system which could take all faxes to be printed, batch them together, and print them during one telephone call. By batching faxes together, the voice mail system would eliminate having to dial the telephone number of the receiving facsimile machine and establish a telephone line to the receiving facsimile machine for each fax. The voice mail system would only have to dial the telephone number and establish the telephone line once.

SUMMARY OF THE INVENTION

The present invention is incorporated into a voice mail system, which can receive, process, and store in "mailboxes" both voice messages and faxes. Stored faxes can be printed at any facsimile machine. Multiple faxes which are ready to be printed are collected together in a dedicated batch mailbox and transmitted to a specified facsimile machine during one telephone call.

The apparatus of the present invention generally comprises a processor, a memory, and line cards. The line cards serve as input and output devices for the voice mail system. The memory is divided to include mailboxes, which store voice messages and faxes, and batch mailboxes, which are each dedicated to a facsimile machine to allow for the batching of faxes during transmission to that facsimile machine.

Faxes and voice messages are stored in the disk drive of the voice mail system. When a facsimile is to be printed at a certain facsimile machine, the voice mail system first looks for a batch queue dedicated to that facsimile machine. If such a batch queue is found, the faxes to be printed are placed into the batch queue. Once the batch queue is connected to a facsimile machine, all faxes in the queue are printed. Additional faxes can be added to the batch queue and will be queued for printing, even as the facsimile machine is printing other queued faxes.

The time stamp of each fax in the batch queue is compared to the current time. If the current time is later than the time stamp, the fax is printed. If the current time is earlier than the time stamp, an entry corresponding to the fax is made in a future delivery table register, to enable printing at a later time. The time stamps of all faxes in the batch queue are compared to the current time and each of the faxes whose time stamp is earlier than the current time is printed. When the printing of faxes is completed, a terminating message is printed and the telephone line is disconnected.

Once every sixty seconds, the future delivery table is scanned for faxes whose time stamp has become less than the current time. When such a fax is found, that fax is scheduled for printing.

If the faxes are to be printed at a facsimile machine which is already printing faxes, the additional faxes are placed in the batch mailbox dedicated to that destination. All of the faxes in the batch queue are then printed during one telephone call.

DESCRIPTION OF THE PREFERRED EMBODIMENT

Figure 1:
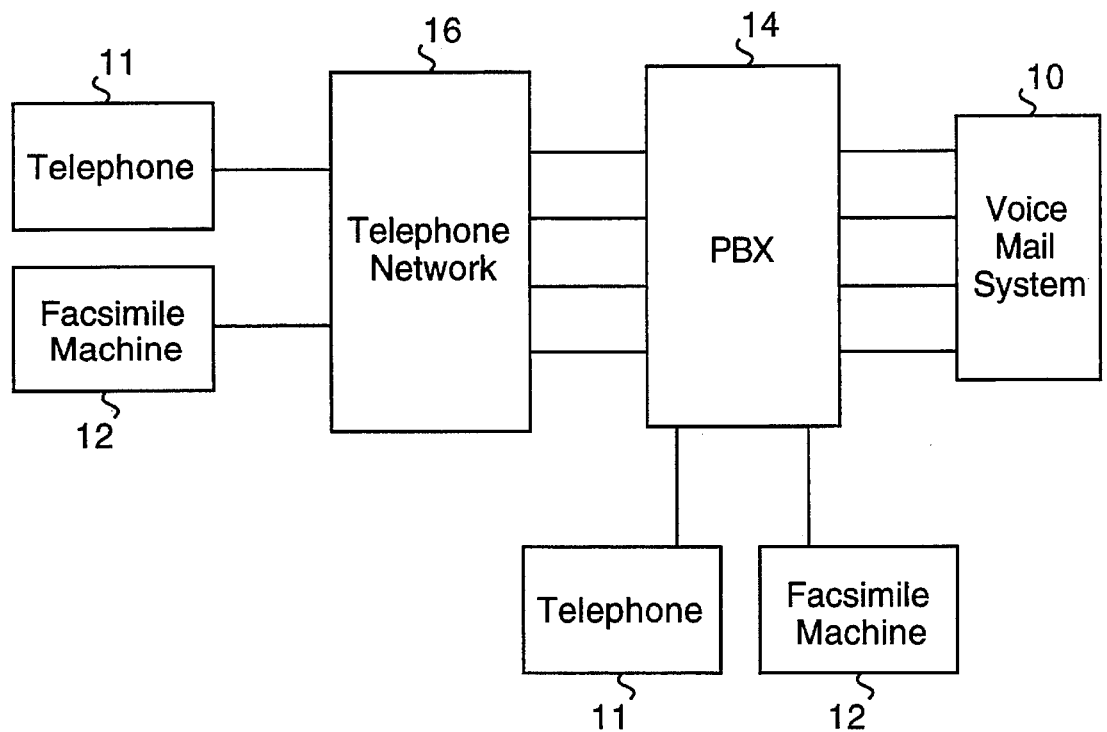
FIG. 1 is a block diagram showing the voice mail system of the present invention connected to a private branch exchange in a typical telecommunications network.

Referring first to FIG. 1, a high level block diagram is shown illustrating a voice mail system 10 connected in a typical telecommunications network. The telecommunications network of FIG. 1 also comprises a telephone network 16, a private branch exchange 14, telephones 11, and facsimile machines 12. Voice mail system 10 is a modification of a conventional voice mail system such as Octel's Aspen®, manufactured by Octel Communications Corporation of Milpitas, Calif. Voice mail system 10 further comprises a plurality of memory storage locations (discussed in more detail below), called mailboxes, for the storage of voice messages and facsimiles. Users, also referred to as subscribers, of voice mail system 10 are assigned one or more of these mailboxes. These mailboxes can be accessed from virtually any telephone and can answer incoming telephone calls, record voice messages from incoming telephone calls, play recorded voice messages for a subscriber through telephone 11, and record incoming facsimiles. The voice messages of subscribers can also be recorded and distributed to other subscribers or to destinations outside the voice mail system 10 either immediately or at a future time. Certain mailboxes within voice mail 10 are designated batch mailboxes, and are characterized by being dedicated to a single facsimile machine 12. All facsimiles that are printed at a facsimile machine 12 with a batch mailbox dedicated to it, are routed through the batch mailbox. The batch mailbox facilitates the batch transmission of facsimiles to a facsimile machine 12.

A private branch exchange ("PBX") 14 provides internal telephone switching for a business and is conventional equipment. PBX 14 is coupled to voice mail system 10 and to telephone network 16.

A facsimile ("fax") is a conventional document that is transmitted to another location over a telephone line. A facsimile machine 12 receives a fax for transmission either as a paper document that is scanned into the facsimile machine or as a computer file that is down-loaded into the facsimile machine. The facsimile machine 12 then transmits the fax to a receiving facsimile machine, where the fax is printed. Voice mail system 10 does not distinguish between facsimile machines 12 that are coupled to PBX 14 and facsimile machines 12 that are coupled to telephone network 16. Likewise, voice mail system 10 does not distinguish between telephones 11 that are coupled to PBX 14 and telephones 11 that are coupled to telephone network 16. Telephone network 16 is the public telephone network for local and long distance telephone service. Telephone network 16 has a central office, various switching centers, and a distribution network.

Figure 2:
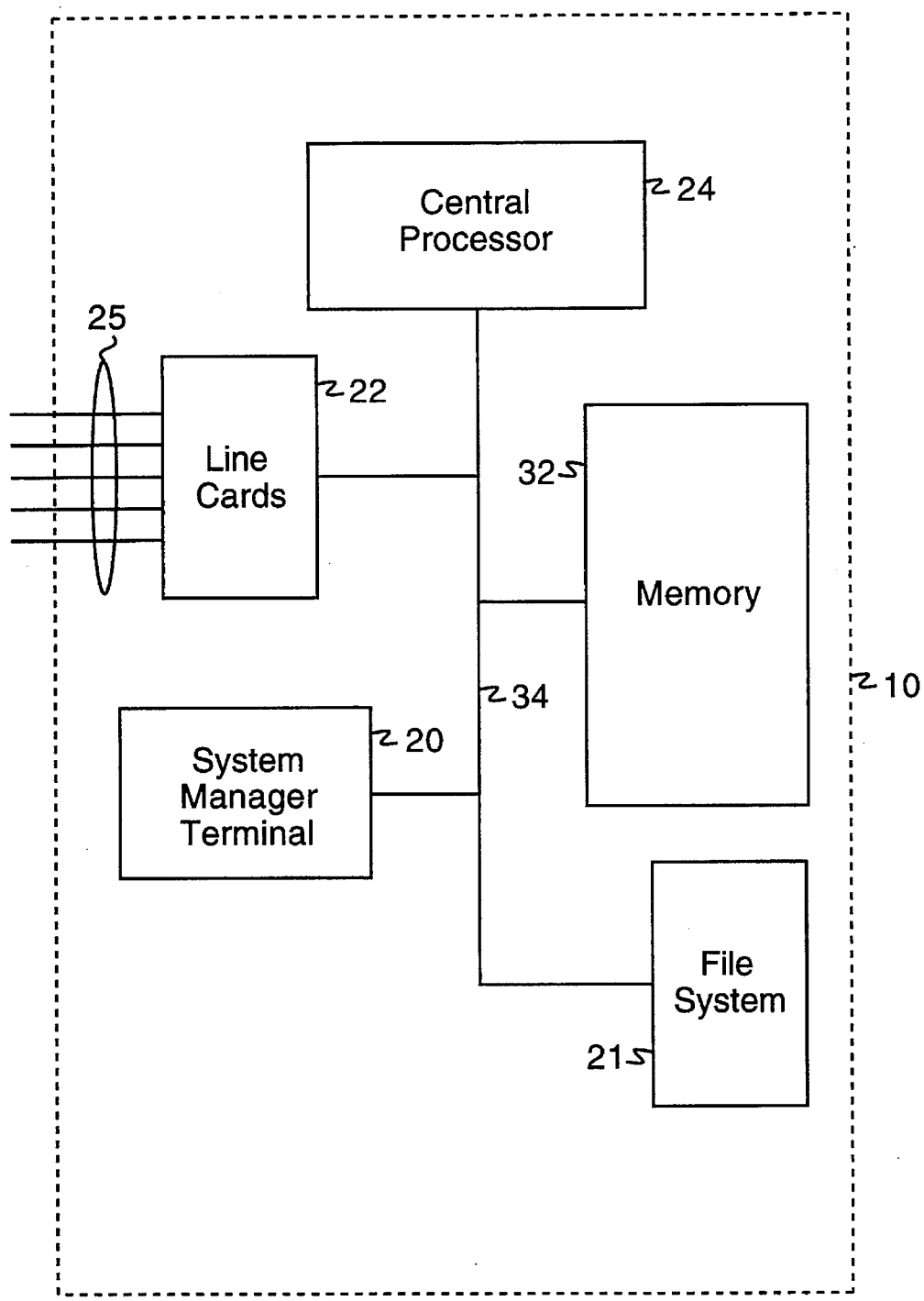
FIG. 2 is a block diagram showing many of the components comprising the voice mail system contained in the preferred embodiment of FIG. 1.

Referring now to FIG. 2, a block diagram is shown illustrating many of the major components of voice mail system 10. Voice mail system 10 comprises a central processor 24 coupled to a memory 32, a file system 21, a system manager and control station 20, and line cards 22. Each of these major components are interconnected through multiple busses including a data bus 34.

Line cards 22 serve as a communications gateway between PBX 14 (FIG. 1) and voice mail system 10. Line cards 22 can automatically switch between sending or receiving voice messages and sending or receiving faxes. Signal processing of voice messages is carried out by line cards 22. Facsimile protocols are also handled by line cards 22. Line cards 22 connect internally to data bus 34 of voice mail system 10 and connect voice mail system 10 to PBX 14 through telephone lines 25.

Central processor 24 controls voice mail system 10 and includes such functions as responding to incoming voice messages, to incoming faxes, and to the current time. In the preferred embodiment, central processor 24 is implemented using an Intel 80×86 based computer voice mail system. Operation of the central processor 24 is controlled through programmed instructions stored in memory 32.

System manager terminal 20 connects to the central processor 24 through data bus 34 and is used for monitoring and controlling the functioning of voice mail system 10. Through system manager terminal 20, subscriber mailboxes are assigned and batch mailboxes are dedicated to some of the facsimile machines 12 (FIG. 1). Should a facsimile machine 12 with a batch mailbox for any reason fail to accept or to print faxes, the faxes may be redirected to another facsimile machine 12 by commands from system manager terminal 20. Such redirection is global; that is afterwards, all faxes intended for the disabled facsimile machine 12 will be automatically printed at the alternate facsimile machine 12 even though the fax is addressed to the disabled facsimile machine 12.

Memory 32 is a conventional active random access memory for the storage of data. Memory 32 stores and reads data in response to commands from the central processor 24.

File system 21 is a conventional disk memory device for the storage of voice messages, faxes, system programs, and voice mail system data. File system 21 is coupled to data bus 34 and responds to read and write instructions from the central processor 24.

Figure 3:
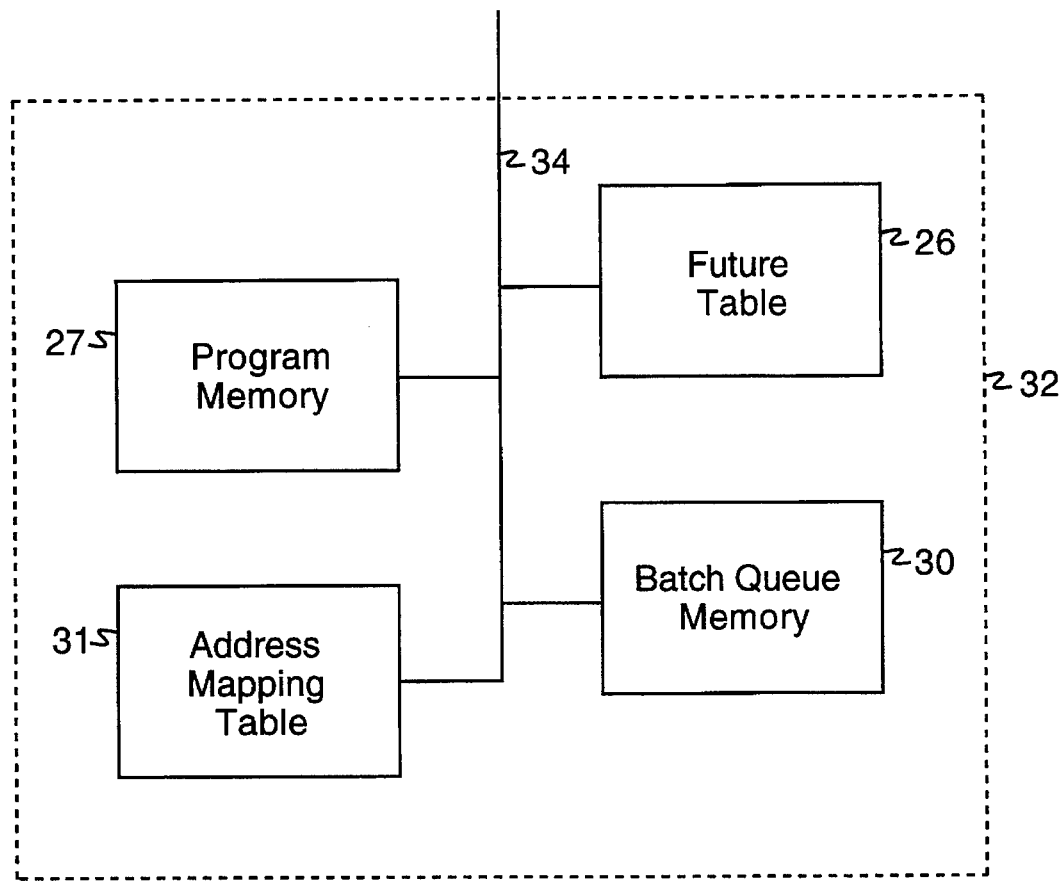
FIG. 3 is a block diagram of components comprising the memory contained in FIG. 2.

Referring now to FIG. 3, a block diagram is shown illustrating many of the major components of memory 32. Memory 32 comprises a future delivery table 26, a program memory 27, a batch queue memory 30, and an address mapping table 31.

Future delivery table 26 is a memory array containing a list of addresses pointing to faxes designated for printing at a future time. Faxes are not transmitted to the intended recipient unless a time stamp associated with the fax indicates a transmit time that is earlier than or equal to (<=) the current system time as maintained by the central processor 24. Before faxes are printed from a mailbox by voice mail system 10, the time stamp of each of the stored faxes is checked to determine whether the fax has been scheduled for a future printing. If the time stamp of a fax is greater than the current time as maintained in central processor 24, the fax is not printed but rather is queued on the future delivery table 26 for later transmission. The future delivery table 26 is periodically reviewed for faxes whose time stamp has become equal to or earlier than the current time. If faxes are found having a time stamp equal to or earlier than the current time, the fax is then processed.

Batch queue memory 30 is a section of memory 32 allocated for storing a list of addresses (a batch queue 39) pointing to fax documents queued for printing through a batch mailbox.

The address mapping table 31 is a section of memory 32 that stores information relating to the subscribers, the identification numbers of subscribers, the addresses of the mailboxes 43 of subscribers, and the addresses of batch mailboxes 45. Program memory 27 is allocated memory used for storing programmed instruction steps which control the operation of voice mail system 10 through the central processor 24.

Figure 4:
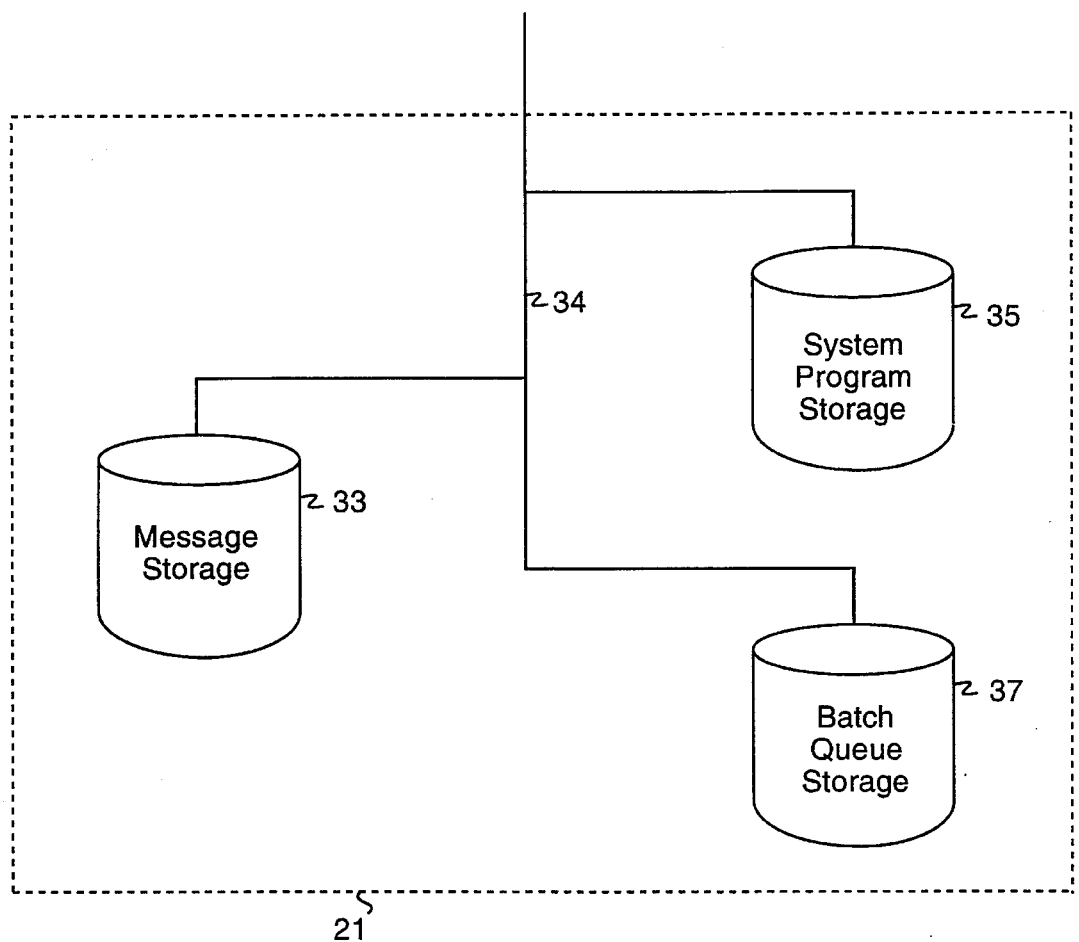
FIG. 4 is a block diagram of components comprising the file system contained in FIG. 3.

Referring now to FIG. 4, a block diagram is shown illustrating many of the major components of file system 21. File system 21 comprises a system program storage 35, a batch queue storage 37, and a message storage 33. System program storage 35 is a conventional disk drive storage used for storing resident system programs. System programs, when active, are transferred to program memory 27 (FIG. 3) for execution by central processor 24.

Batch queue storage 37 is a separate section of file system 21 dedicated to the storage of batch queues 39. Batch queues 39 contain addresses pointing to faxes stored in message storage 33 mailboxes 43, which are waiting to be printed by a batch mailbox at a facsimile machine 12.

Figure 5:
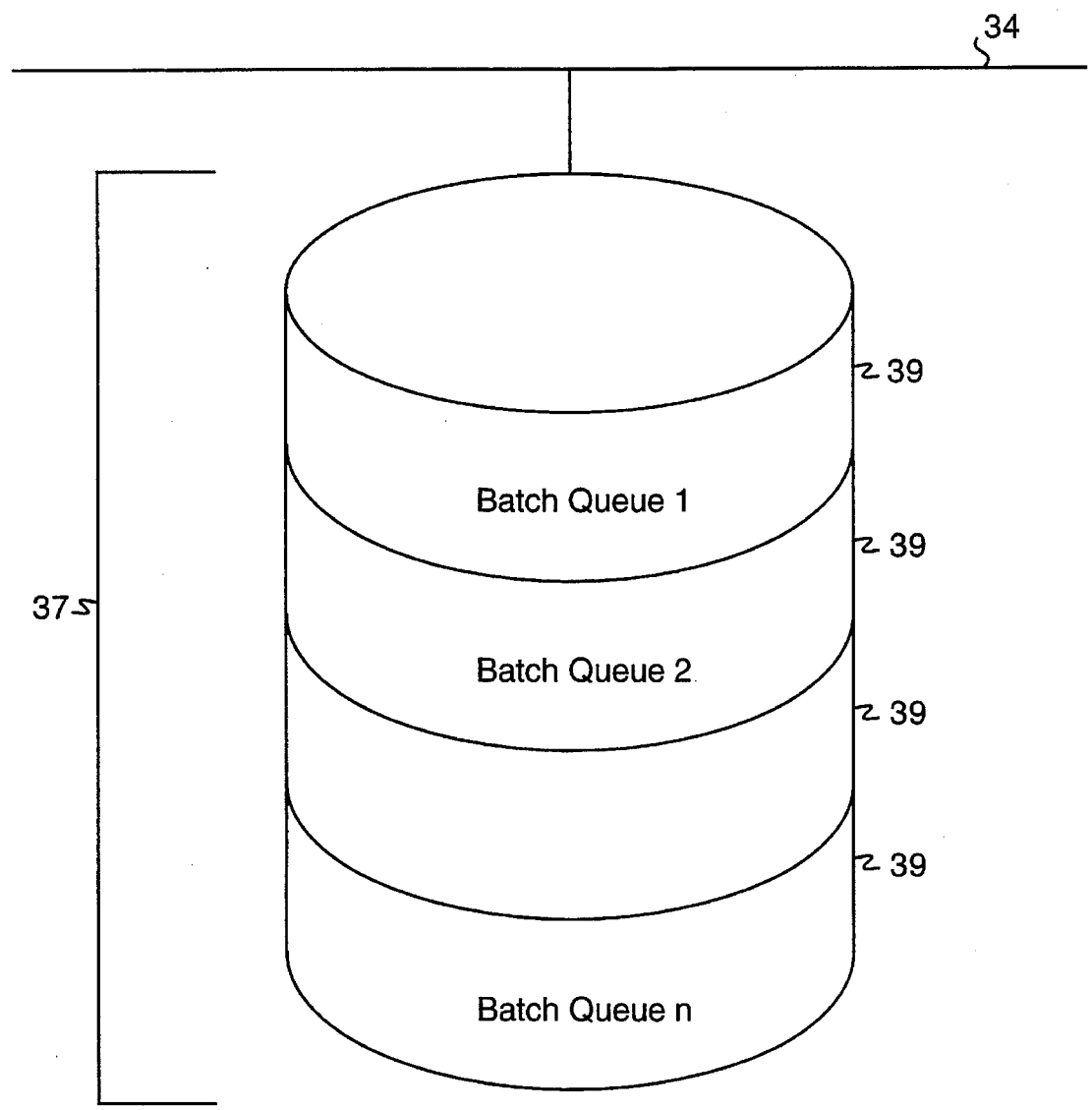
FIG. 5 is a block diagram illustrating the structure of the batch queue storage contained in FIG. 4.

Referring now to FIG. 5, a block diagram is shown illustrating the batch queue storage 37 in greater detail. The batch queue storage 37 is divided into allocated sections of memory, each section holding a batch queue 39. The batch queue 39 contains addresses pointing to faxes stored in message storage 33 mailboxes 43. Each batch mailbox 45 uses a batch queue 39 for ordering the printing of faxes at a designated facsimile machine 12. The batch queue storage 37 of FIG. 5 is shown having sequentially ordered batch queues 39. Alternatively, the batch queues 39 could be equivalently located randomly on a mass storage device used for containing mailboxes 43 in a voice mail system 10.

Figure 6:
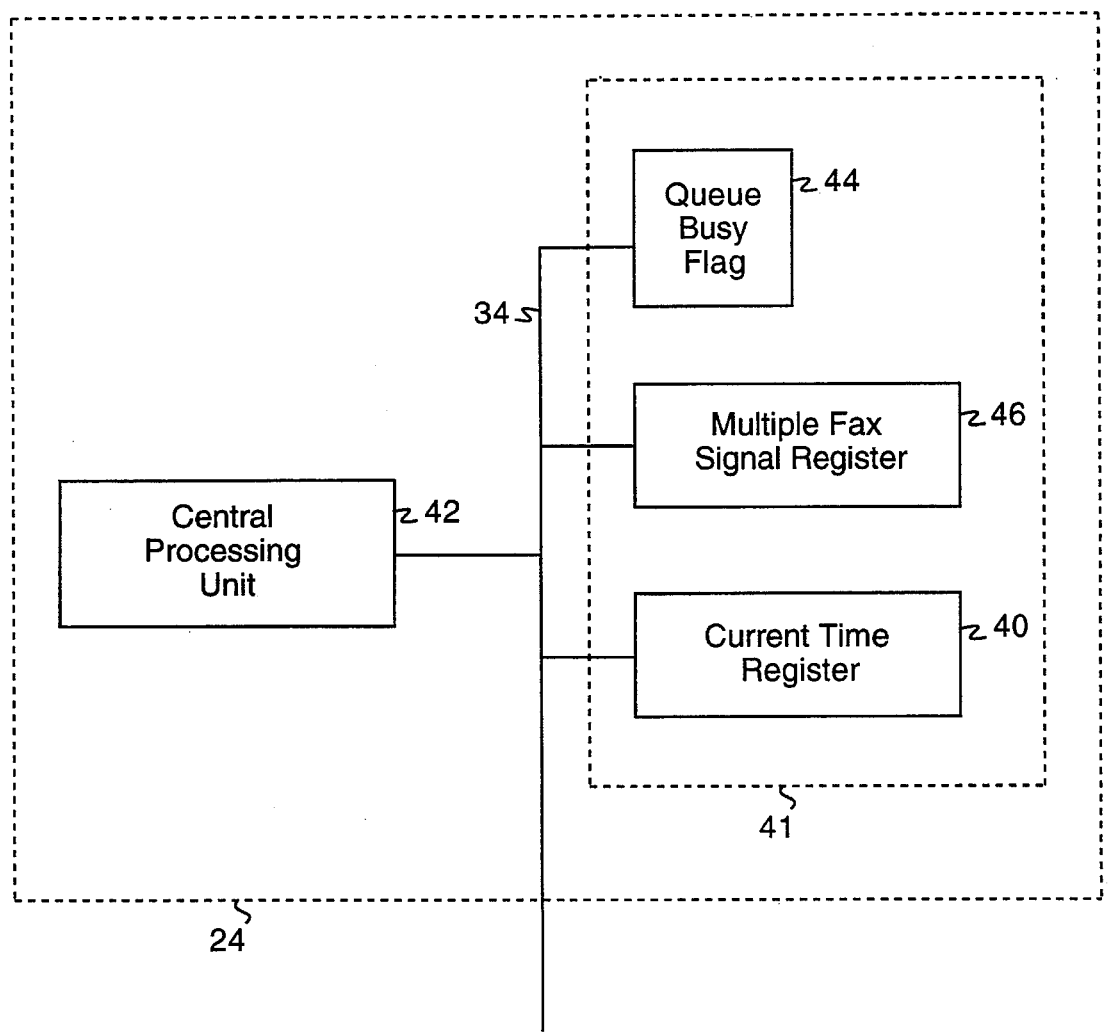
FIG. 6 is a block diagram of components comprising the processor contained in FIG. 2.

Referring now to FIG. 6, a block diagram is shown illustrating the major components of central processor 24. Central processor 24 comprises a central processing unit 42, a queue busy flag 44, a multiple fax signal register 46, and a current time register 40. Some of the components of central processor 24 may be grouped together as a central processor memory 41. Central processor memory 41 comprises a queue busy flag 44, a multiple fax signal register 46, and a current time register 40.

The operation of central processor 24 is controlled by a central processing unit 42, which is preferably a microprocessor such as the Intel 80x86, from Intel Corporation of Sunnyvale, Calif. Central processing unit 42 is coupled to data bus 34 and responds to the current time and to external commands. The queue busy flag 44 is a flag for the storage and transmission of signals. When faxes are printing from a particular batch queue 39, the queue busy flag 44 is set; the queue busy flag 44 is reset when faxes are not printing. Multiple fax signal register 46 provides a signal that there is another fax to be printed after the printing of the current fax is complete. Current time register 40 stores the current time and is continually updated by central processing unit 42.

Figure 7:
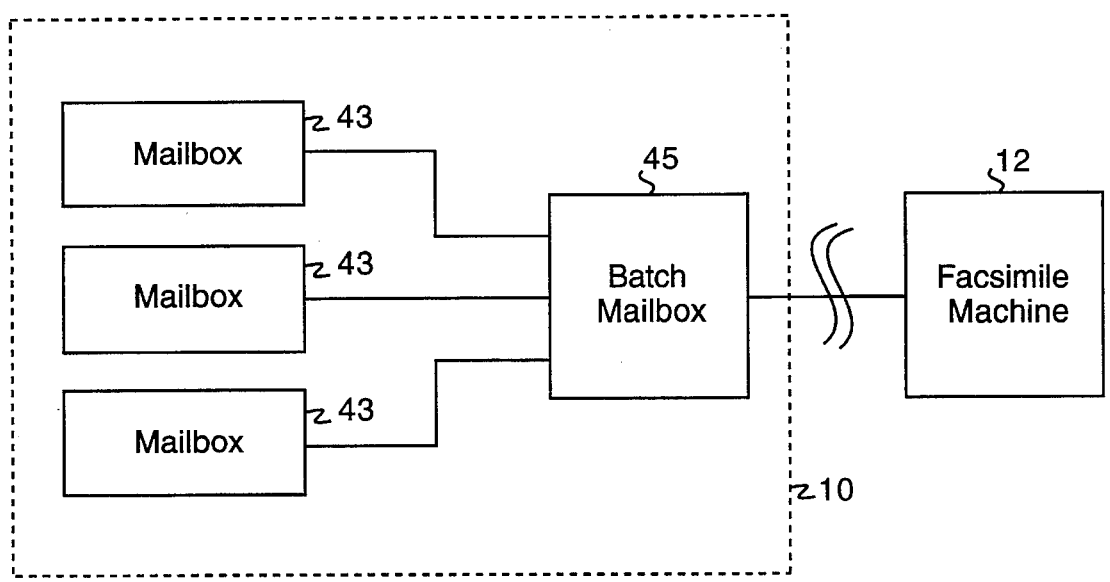
FIG. 7 is a block diagram illustrating the connection of mailboxes to a facsimile machine using a batch mailbox.

Referring now to FIG. 7, a block diagram is shown illustrating the connection of one or more mailboxes 43 to a facsimile machine 12 through a batch mailbox 45. The mailboxes 43 store individual voice messages and faxes and are assigned sections of message storage 33 (FIG. 4) contained within file system 21. The batch mailboxes 45 are assigned sections of batch queue storage 37 (FIG. 4) contained within file system 21. The function of the batch mailbox 45 is to maximize the throughput and efficiency associated with printing faxes from the mailboxes 43 by concentrating multiple parallel messages along a single communication pathway. Generally, when a fax is to be printed from mailbox 43 to facsimile machine 12 with a dedicated batch mailbox 45, the fax is initially routed to batch mailbox 45 where it is placed in a batch queue 39 along with other faxes waiting to be printed at facsimile machine 12. The batch mailbox 45 connects to the facsimile machine 12 through PBX 14 or through telephone network 16 and PBX 14 (FIG. 1), and begins transmitting the faxes queued in the batch queue 39 at the facsimile machine. As additional faxes are received by the batch mailbox 45 from the various mailboxes 43, these faxes are added to batch queue 39. The batch mailbox 45 transmits all faxes queued in the batch queue 39 until the batch queue 39 is empty.

Figure 8A:
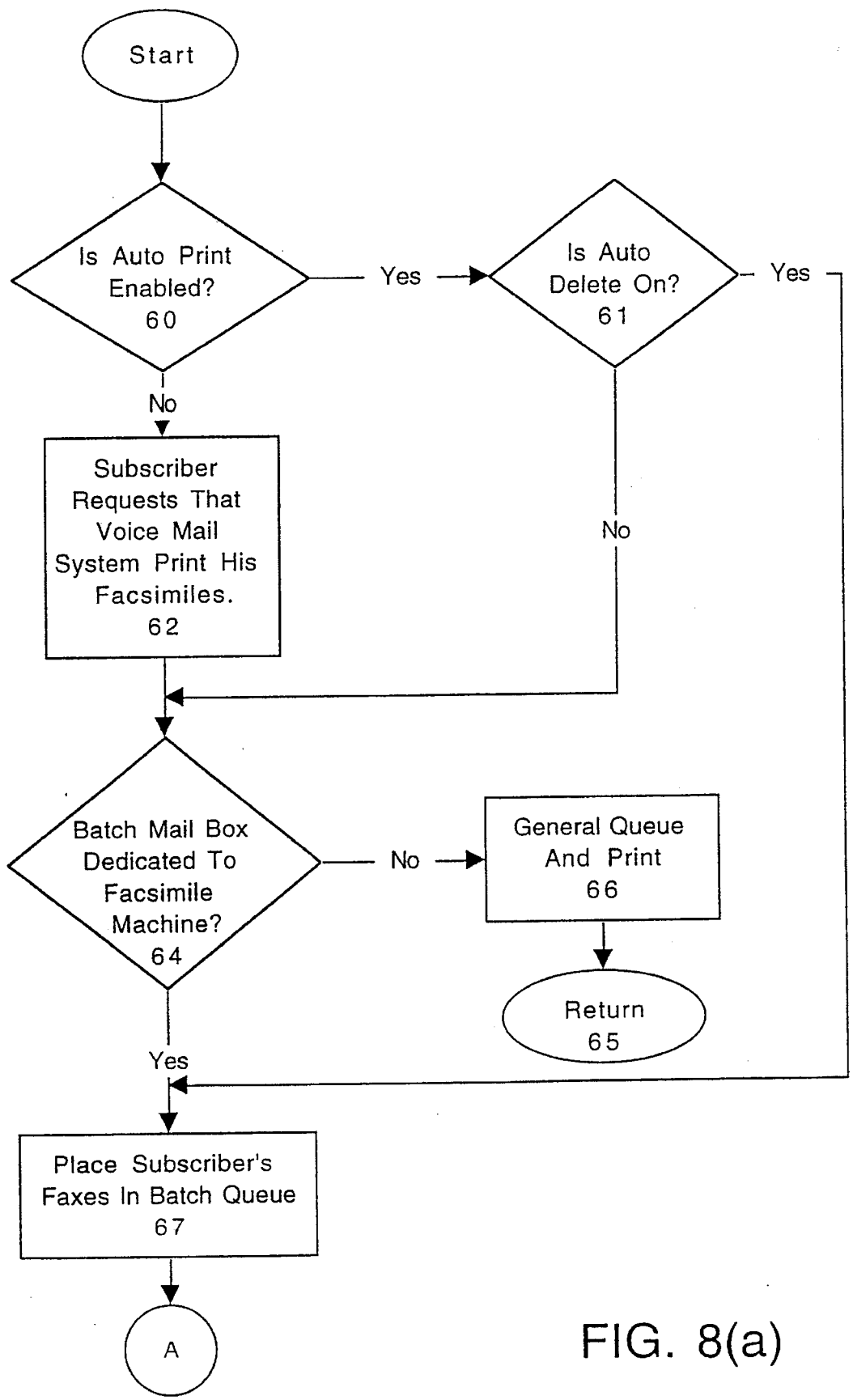
FIGS. 8(*a*), 8(*b*), and 8(*c*) contain a flowchart illustrating the method steps for the batch transmission of faxes.
Figure 8B:
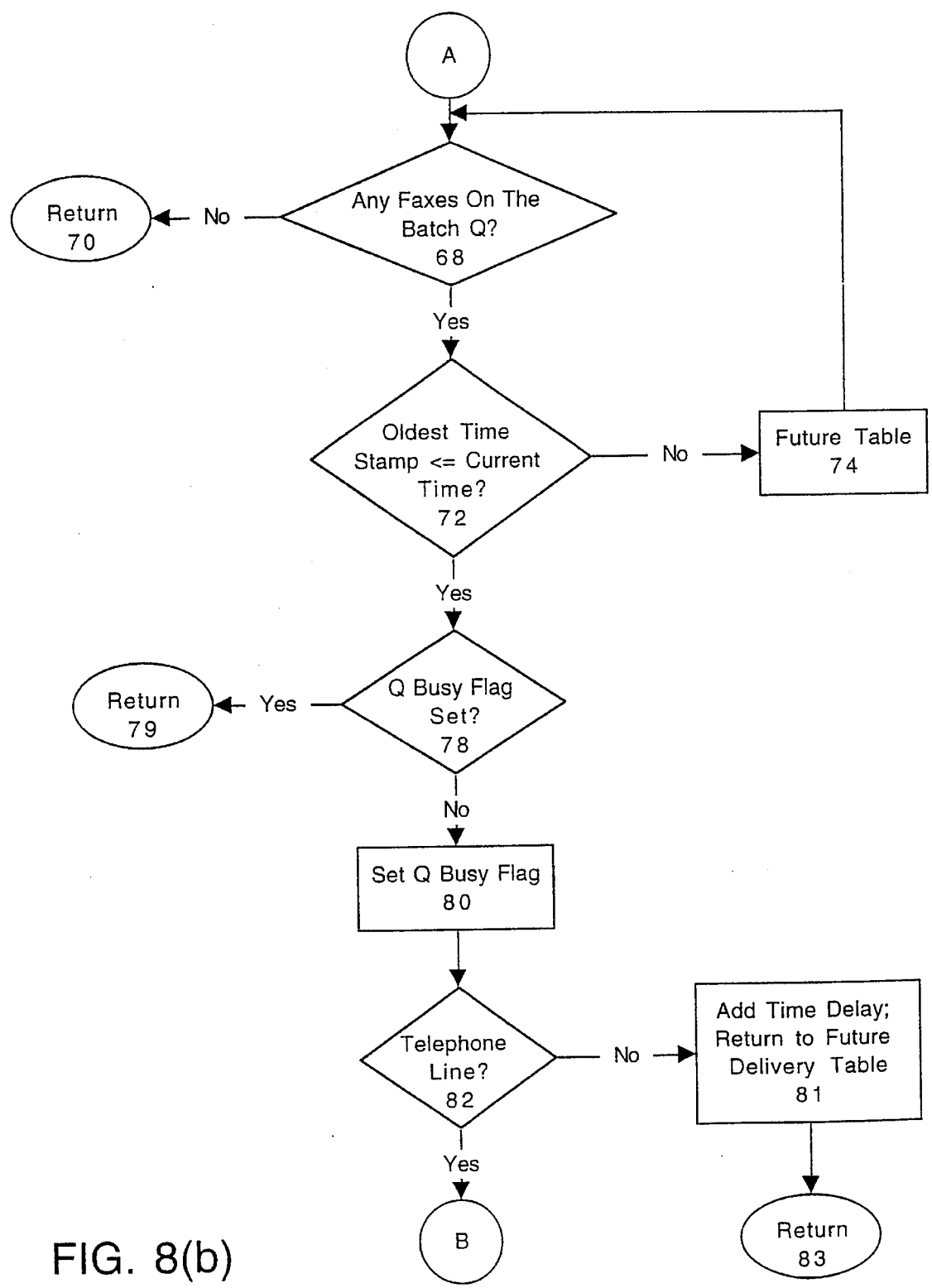
Figure 8C:
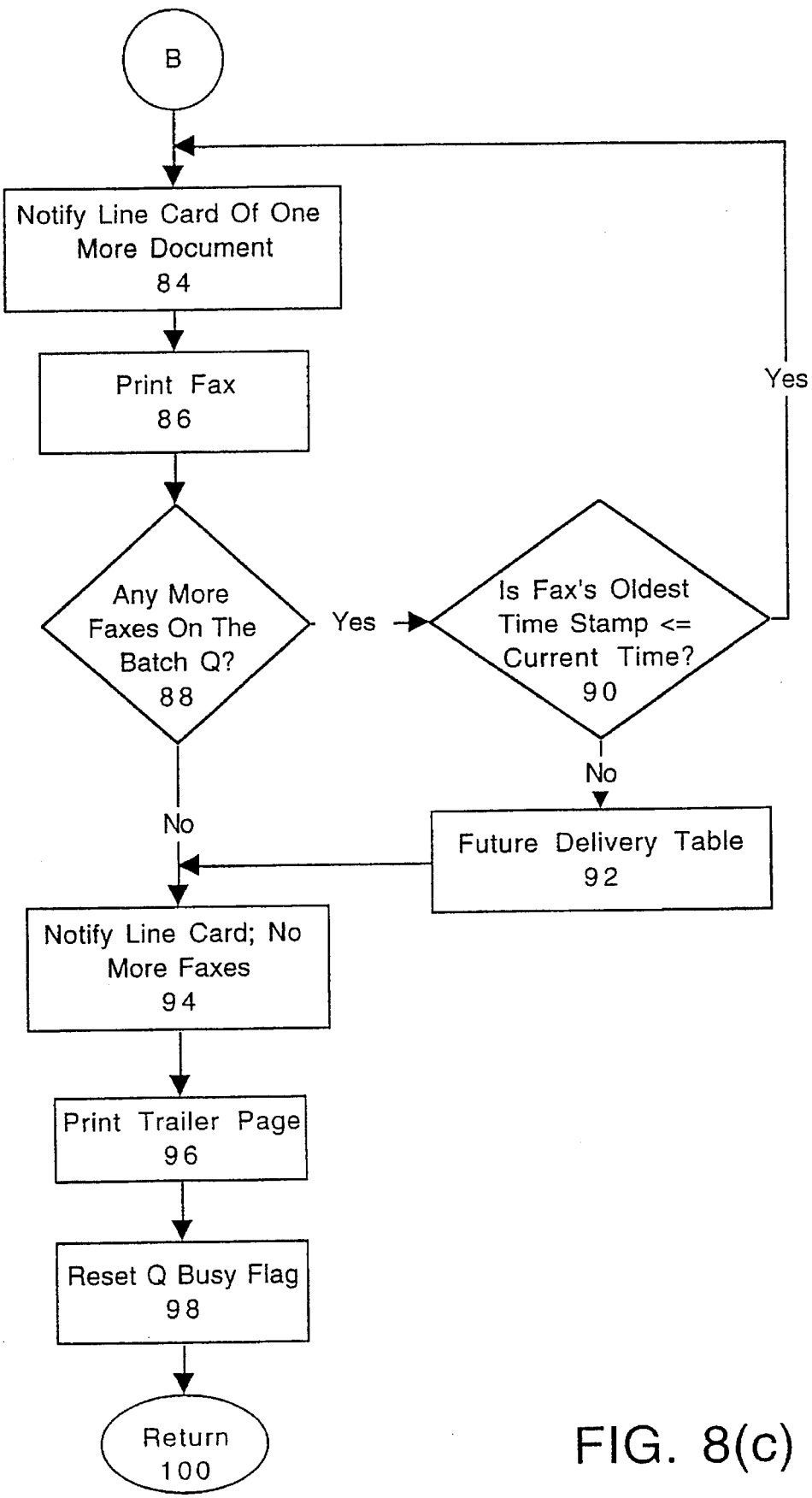

Referring now to FIGS. 8(a), 8(b), and 8(c), a flowchart is shown illustrating the method by which voice mail system 10 batches and prints faxes using the mailbox configuration shown in FIG. 7. Voice mail system 10 normally receives and stores faxes in the same way that voice messages are handled in conventional voice mail systems. The batching features of voice mail system 10 are optional features. Voice mail system 10 may be switched to an auto-print mode in which faxes are printed on facsimile machine 12 as soon as they are received. When the auto print enable is switched "on," voice mail system 10 behaves as a conventional facsimile machine. The auto print mode has the advantage of eliminating the need for subscriber inquiry to voice mail system 10 to determine whether faxes have been received. The disadvantage of auto print is that privacy is sacrificed as to the faxes received, since the faxes will be immediately printed and will be available to anyone receiving faxes at the facsimile machine 12. When the auto print mode has not been enabled, the incoming faxes are stored in subscriber mailboxes 43. The first step of the method of the printing routine shown in FIG. 8(a) is to determine 60 whether the auto print mode is enabled. If auto print is enabled, the voice mail system 10 determines 61 if the auto-delete is enabled. The auto-delete is a function that automatically erases faxes from message storage 33 once the fax is printed. If auto print is not enabled, the subscriber may request 62 that voice mail system 10 print the stored faxes. If in step 61 the auto-delete is not enabled, the voice mail system 10 by-passes step 62 and immediately searches 64 for a batch mail box 45.

When in Step 62 a subscriber requests that the voice mail system 10 print the faxes in his mailbox 43 at a specific facsimile machine 12, the central processor 24 first searches 64 for a batch mailbox 45 dedicated to the facsimile machine 12; otherwise the voice mail system 10 proceeds to step 67. If in step 64 the facsimile machine 12 does not have a batch mailbox 45 dedicated to it, the voice mail system 10 will place the fax on the general queue for printing 66 individually to that facsimile machine 12. If there is a batch mailbox 45 dedicated to the facsimile machine 12, the faxes of the subscriber are placed 67 in the batch queue 39 associated with that batch mailbox 45. In step 68, the batch queue 39 is scanned to determine whether any faxes are stored in the batch queue. If there are no entries in the batch queue 39, the voice mail system 10 returns 70 from the printing routine and resumes other processing. If there are faxes in the batch queue 39, the time stamp associated with the fax is analyzed 72 to determine whether the oldest time stamp is set for a time earlier than or equal to (<=) the current time as stored in the current time register 40 (FIG. 6). If the oldest time stamp is later than (>) the current time as stored in current time register 40 (FIG. 6), the fax will not be printed. In Step 74, an entry is made on the future delivery table 26 (FIG. 3) identifying the fax for future printing and processing returns to Step 68 where the batch queue 39 is scanned 68 for other faxes.

If in Step 72, the oldest time stamp is earlier than the current time, the queue busy flag 44 (FIG. 6) is queried 78. If the queue busy flag 44 is set, then faxes are already being transmitted from the batch queue 39 and processing returns 79 from the printing routine. This situation may arise when a subscriber requests the printing of faxes at a facsimile machine 12 already being used by another subscriber, within voice mail system 10, to print faxes. The underlying processing of faxes, which originally set the queue busy flag 44, is not affected.

If the queue busy flag 44 is reset, the queue busy flag 44 is set 80 and an attempt 82 is made to establish a telephone line 25 (FIG. 2) connection to the printing facsimile machine 12. Should voice mail system 10 fail for any reason to establish a telephone line 25 to the receiving facsimile machine 12, the time stamp of the fax is modified to the current time plus a delay. The delay allows for the possible removal of the impediment to establishing a telephone line 25 to facsimile machine 12 before voice mail system 10 attempts another transmission. An entry is then entered 81 on the future delivery table 26, and processing then returns 83 from the printing routine.

When voice mail system 10 establishes a telephone line 25, the line card 22 (FIG. 2) is notified 84 that there is another fax to be printed. Once the line card 22 is notified 84, the fax is printed 86 and the batch queue 39 is then scanned 88 for other faxes waiting to be printed. If there are other faxes in the batch queue 39, the time stamp of each fax is then analyzed in Step 90. If the oldest time stamp of a fax is earlier than (<=) the current time as stored in the current time register 40 (FIG. 6), processing returns to Step 84, where the line card 22 is notified 84 and the fax is printed 86. If there are no faxes whose oldest time stamp is later than the current time as stored in the current time register 40, entries are made 92 on the future delivery table 26 regarding the faxes, and processing continues.

When there are no faxes on the batch queue 39 whose oldest time stamp is earlier than the current time, the line card 22 is notified 94 that there are no more faxes to be printed. A trailer page is then printed 96 to signal the subscriber that all faxes have been printed, and the queue busy flag 44 is reset in Step 98. Transmission of faxes to this facsimile machine 12 is complete, and processing returns 100 from the printing routine.

Figure 9:
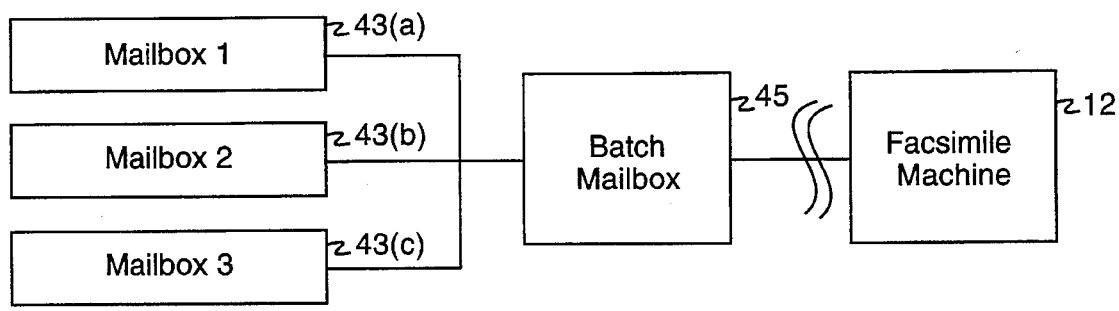
FIG. 9 is a block diagram illustrating the connection of more than one mailbox to a facsimile machine using a batch mailbox.

Referring now to FIG. 9, a block diagram is shown illustrating an example embodiment of the fax printing architecture of FIG. 7. The example of FIG. 9 shows mailboxes 1, 2 & 3 (43(a)–43(c)), printing to a facsimile machine 12, through a batch mailbox 45. For the purposes of the FIG. 8 example, mailbox 1 is owned by subscriber$_1$, mailbox 2 is owned by subscriber$_2$, and mailbox 3 is owned by subscriber$_3$. Assume that subscriber$_1$ has accessed mailbox 1 and has instructed mailbox 1 to print the faxes contained in mailbox 1 at facsimile machine 12. The facsimile machine 12 has been designated a batch destination and has been assigned a batch mailbox 45. As the printing is taking place, subscriber$_2$ instructs mailbox 2 to print faxes at the facsimile machine 12. Mailbox 2 places the faxes that it contains into the batch mailbox 45. In this event, batch mailbox 45 receives and prints the faxes from mailbox 2 during the same telephone call that the batch mailbox 45 initiated for printing faxes from mailbox 1.

Referring once again to FIGS. 8(a), 8(b), and 8(c), the method steps of the present invention can be illustrated using the example embodiment of FIG. 9. The process begins when subscriber$_1$ requests 62 the printing of faxes stored in mailbox 1 at a facsimile machine 12. Central processor 24 searches 64 for a batch mailbox 45 dedicated to the facsimile machine 12. When the batch mailbox 45 is found, the faxes are placed 67 in the batch queue 39 of the batch mailbox 45 from mailbox 1.

The batch queue 39 is then scanned 68 for a fax. If a fax is found, the time stamp associated with the fax is analyzed 72. If the time stamp is later than (>) the current time as stored in the current time register 40 (FIG. 6), an entry is made 74 on the future delivery table 26 identifying the fax, and processing returns to Step 68 to scan 68 for other faxes. If in Step 72 the time stamp is earlier than or equal to (<=) the current time as stored in current time register 40 (FIG. 5), the queue busy flag 44 is queried in Step 78. If the queue busy flag 44 is reset, the queue busy flag 44 is set 80 and processing proceeds through the steps, as set forth above, to print the faxes.

At some time between the setting 80 of the queue busy flag 44 and the resetting 98 of the queue busy flag 44, subscriber$_2$ accesses mailbox 2. Subscriber$_2$ requests 62 mailbox 2 to print the faxes that mailbox 2 contains at the same facsimile machine 12 being used by subscriber$_1$. The central processor 24 of voice mail system 10 searches 64 for and finds the batch mailbox 45 dedicated to this facsimile machine 12 and places 67 the faxes from mailbox 2 in the batch queue 44 that is associated with this batch mailbox 45. The batch queue 39 is then scanned 68 for faxes. When a fax is found, the time stamp of the fax is analyzed in Step 72. If the time stamp is earlier than (<=) the current time as stored in the current time register 40 (FIG. 6), the queue busy flag 44 is queried in Step 78.

As set forth above, subscriber$_1$ is printing faxes at the same facsimile machine 12 that subscriber$_2$ designated, and, therefore, the queue busy flag 44 is set. The printing of faxes that subscriber$_2$ initiated ends and processing returns 79 from the printing routine. The faxes from mailbox 2, however, are now in the batch queue 39 and will be printed during the same telephone call that voice mail system 10 initiated to print the faxes from mailbox 1.

Figure 10:
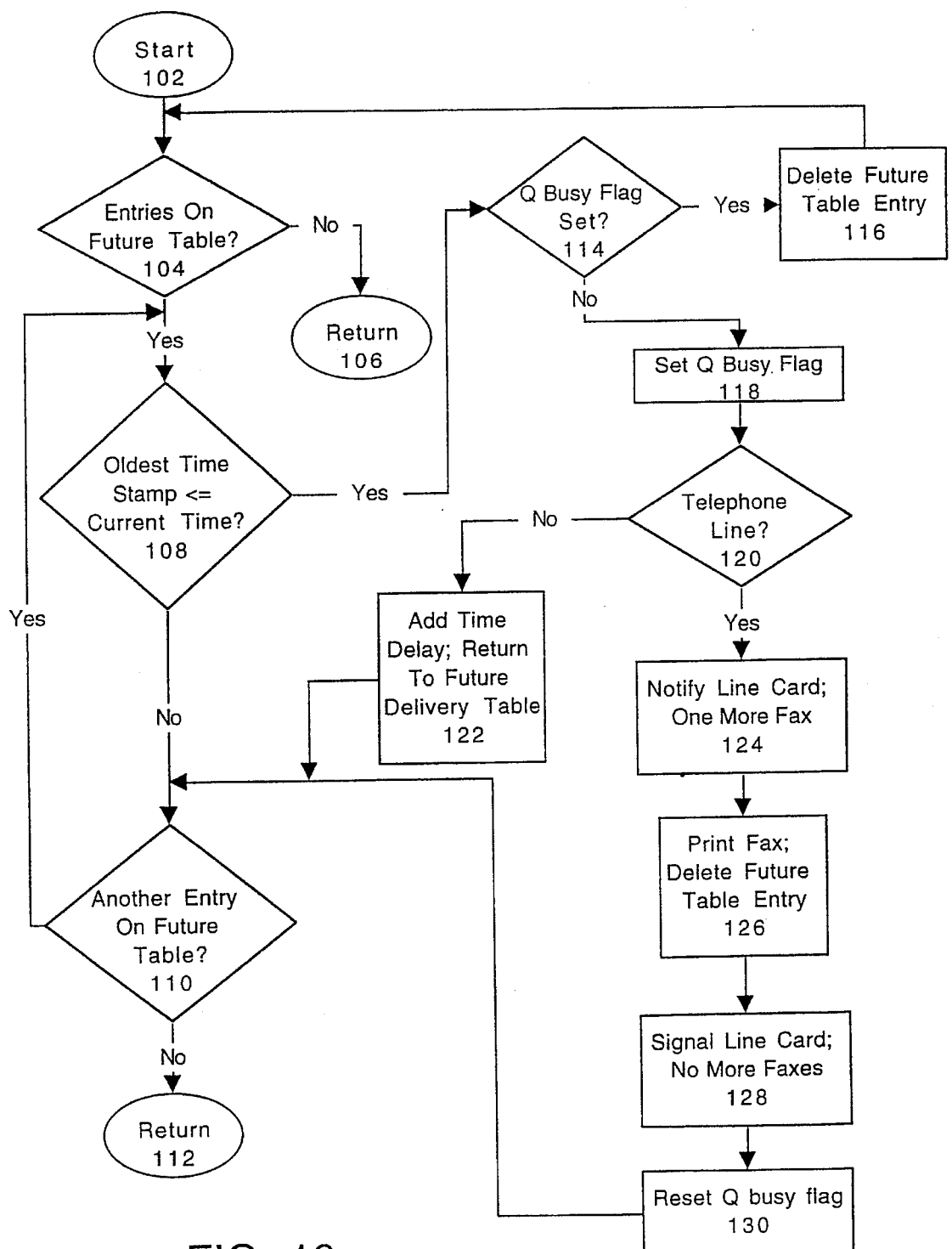
FIG. 10 is a flowchart illustrating the method steps for transmitting faxes from two mailboxes to a facsimile machine through a batch mailbox.

Referring now to FIG. 10, a flowchart is shown illustrating the method for printing faxes that are referenced on future delivery table 26. Every sixty seconds, a review of future delivery table 26 is initiated 102 and future delivery table 26 is scanned 104 for referenced faxes. Voice mail system 10 carries out this function while it is simultaneously carrying out all other functions. If there are no faxes referenced on future delivery table 26, processing of future delivery table 26 references ends, and processing returns 106 from printing faxes referenced on the future delivery table 26. If there are faxes referenced on future delivery table 26, the time stamp of the first referenced fax is analyzed 108. If the time stamp is later than the current time as stored in current time register 40 (FIG. 6), the future delivery table 26 is scanned 110 for other faxes. If there are no other faxes, processing returns 112 from printing faxes referenced on future delivery table 26. If there are other fax entries on the future delivery table 26, processing returns to Step 108 where the time stamp of the next future delivery table 26 entry is analyzed 108.

If in Step 108 the time stamp is earlier than the current time as stored in current time register 40 (FIG. 6), the queue busy flag 44 is queried in Step 114. If the queue busy flag 44 is set, the reference to the fax is deleted 116 from the future delivery table 26 and processing returns to Step 104. In this situation, a subscriber is printing the faxes on the batch queue 39 on which this fax resides. This fax will be printed along with the other faxes on the batch queue 39.

If in Step 114 the queue busy flag 44 is reset, the queue busy flag 44 is then set in Step 118. An attempt 120 is then made to establish a telephone line 25 connection to the destination facsimile machine 12. If a telephone line 25 cannot be established to facsimile machine 12, the reference to the fax on future delivery table 26 is modified 122 by adding a time delay to the time stamp. This time delay is set by the system manager through the system manager terminal 20 and can be modified as needed. The delay is added to the future delivery table 26 entry to allow the connection problem to be resolved before a further attempt is made to print the fax. Following Step 122, processing returns to Step 110 to scan 110 future delivery table 26 for other faxes.

If in step 120 a telephone line 25 is established to the facsimile machine 12, the line card 22 is notified 124 of a fax to print. The fax is printed 126 and the reference to the fax on the future delivery table 26 is deleted 126. The line card 22 is signaled 128 that there are no additional faxes to print, and the queue busy flag 44 is reset 130. Processing then returns to Step 110 and scans 110 future delivery table 26 for other faxes.

In summary, the present invention will batch not only faxes from a single mailbox but faxes from multiple mailboxes. The faxes are batched by routing all faxes to be printed at the same facsimile machine 12 through a batch mailbox 45 that is dedicated to the facsimile machine 12. The batch mailbox 45 prints all faxes in its batch queue 39 during a single telephone call. Should any faxes be placed in the batch queue 39 during a transmission, the new faxes will be printed along with the faxes already in the batch queue. The batch mailbox 45 references any fax whose time stamp is greater than the current time on the future delivery table 26. Once every sixty seconds the present invention reviews the future delivery table 26 for faxes whose time stamp has become equal to or earlier than the current time. If a fax, referenced by the future delivery table 26, is identified as being scheduled for current printing, the fax will be printed at facsimile machine 12.

The foregoing description of a preferred embodiment of the invention has been presented for purposes of illustration and description. It is not intended to be exhaustive or to limit the invention to the precise form disclosed. Obvious modifications or variations are possible in light of the above teachings. For example the voice mail system 10 may more generally be viewed as an electronic communication system where a variety of information media may be received, stored, and exchanged. Another possible variation is a "hard wired" implementation where all components are physically embodied in the device. All such modifications and variations are within the scope of the invention as determined by the appended claims when interpreted in accordance with the breadth to which they are legally or equitably entitled.

What is claimed is:

1. An apparatus for redirecting facsimile documents from a first facsimile machine to a second facsimile machine comprising:

a first batch mailbox coupled to the first facsimile machine and a batch queue memory, the batch queue memory containing ordered addresses pointing to facsimile documents stored in said first batch mailbox waiting to be printed at the first facsimile machine; and a processor coupled to the batch queue memory for selectively associating the entire contents of the batch queue memory in order to redirect facsimile documents for printing on the second facsimile machine.

2. The apparatus according to claim 1, wherein the facsimile documents waiting to be printed on the first facsimile machine are redirected for printing on the second facsimile machine when the first facsimile machine is disabled.

3. The apparatus according to claim 1, further comprising a second batch mailbox coupled between the first batch mailbox and the second facsimile machine, the second batch mailbox for receiving facsimile documents which have been redirected for printing on the second facsimile machine.

4. The apparatus according to claim 1, further comprising a plurality of electronic mailboxes connected to the first batch mailbox for sending facsimile documents to the first batch mailbox.

5. The apparatus according to claim 4 wherein the first batch mailbox receives and buffers the facsimile documents from the plurality of electronic mailboxes.

6. The apparatus according to claim 1, wherein the facsimile documents stored in the first batch mailbox further comprise an appended time stamp.

7. The apparatus according to claim 6, wherein the time stamp indicates the time at which the stored facsimile documents are to be transmitted to the first facsimile machine.

8. The apparatus according to claim 7, wherein the first batch mailbox periodically checks the time stamps of the stored facsimile documents and determines which of the facsimile documents are scheduled for transmission to the first facsimile machine.

9. The apparatus according to claim 8, wherein the batch mailbox checks the time stamps of stored facsimile documents every sixty seconds.

10. A method in a telephone system for redirecting facsimile documents from a first facsimile machine to a second facsimile machine, the method comprising the steps of:

receiving a facsimile address in a batch queue memory pointing to a stored facsimile document;

queuing the facsimile address in the batch queue memory, thereby scheduling the transmission of the stored facsimile document for printing on the first facsimile machine;

redirecting the entire contents of the batch queue memory in order that the stored facsimile document scheduled for printing on the first facsimile machine is thereafter scheduled for printing on the second facsimile machine; and transmitting the stored facsimile document to the second facsimile machine for printing.

11. The method according to claim 10 in which the telephone system further comprises a first batch mailbox coupled to the batch queue memory and to the first facsimile machine, and a second batch mailbox coupled to the batch queue memory and to the second facsimile machine; wherein the stored facsimile document is stored in the first batch mailbox when said stored document is scheduled for printing on the first facsimile machine and said stored facsimile document is stored in the second batch mailbox when the stored facsimile document is scheduled for printing on the second facsimile machine; and wherein said stored facsimile document is printed on the first facsimile machine by transferring the stored facsimile document from the first batch mailbox to the first facsimile machine when the stored facsimile document is stored in the first batch mailbox, and the stored facsimile document is printed on the second facsimile machine by transferring the stored facsimile document from the second batch mailbox to the second facsimile machine when the stored facsimile document is stored in the second batch mailbox.

12. The method according to claim 11, wherein during the transmitting of the stored facsimile document from the second batch mailbox to the second facsimile machine, an additional facsimile document is transferred into the second batch mailbox for transmission to the second facsimile machine.

13. The method according to claim 11 in which following the step of transmitting the stored facsimile document from the second batch mailbox to the second facsimile machine, the batch mailbox instructs the second facsimile machine to print a trailer page.

14. The method according to claim 11, wherein the stored facsimile document further comprises a time stamp identifying the time at which the stored facsimile document is to be transferred from the second batch mailbox to the second facsimile machine.

15. The method according to claim 14, wherein the system further comprises a system clock for providing a current time, wherein the second batch mailbox only transfers the stored facsimile document to the second facsimile machine if the current time is not earlier than the time stamp.

16. The method according to claim 15, wherein the second batch mailbox periodically checks the time stamp of each stored facsimile document in the second batch mailbox to determine whether the current time is earlier than the time stamp.

17. The method according to claim 11, wherein following the step of redirecting the queued facsimile address to a second batch mailbox, the method further comprises the step of redirecting future facsimile addresses received in the first batch mailbox to the second mailbox.

18. The method according to claim 10, wherein, following the step of transferring the stored facsimile document to the second facsimile machine the facsimile address is automatically deleted from the batch queue memory.

19. A facsimile communication system for the batch delivery of facsimile documents comprising:
   a facsimile machine for receiving and printing facsimile documents;
   a communication link coupled to the facsimile machine for delivering facsimile documents to the facsimile machine; and
   a batch mailbox which selectively connects to the facsimile machine through the communication link when facsimile documents are received by the batch mailbox from subscribers, the batch mailbox further comprising:
      storage memory containing stored facsimile documents waiting to be printed at the facsimile machine;
      a batch queue containing ordered addresses pointing to facsimile documents contained in the storage memory; and
      a queue busy flag having a first state and a second state, the queue busy flag switching to the first state when the batch mailbox is connected to the facsimile machine.

20. The system according to claim 19, wherein facsimile documents which are received by the batch mailbox while the queue busy flag is in the first state are placed in the batch queue and transmitted to the facsimile machine while the batch mailbox is connected to the facsimile machine.

21. The system according to claim 19, wherein a facsimile document which is received by the batch mailbox while the queue busy flag is in the second state causes the batch mailbox to selectively connect through the communication link to the facsimile machine.

22. The system according to claim 21, wherein no said selective connection occurs while the queue busy flag is in the first state.

23. A method in a facsimile communication system for the batch delivery of facsimile documents, the method comprising the steps:
   receiving a facsimile document in a batch mailbox;
   queuing the facsimile document in the batch mailbox, thereby scheduling the transmission of the queued facsimile document to a facsimile machine for printing;
   establishing a communication link between the batch mailbox and the facsimile machine;
   setting a queue busy flag corresponding to the batch mailbox signaling that a communication link has been established;
   disabling the batch mailbox from establishing further communication links while the queue busy flag is set;
   transmitting the queued facsimile documents to the facsimile machine; and
   disconnecting the communication link when all queued facsimile documents have been transmitted.

24. The method according to claim 23 further comprising the step of resetting the queue busy flag once the communication link has been disconnected.

25. The method according to claim 24 further comprising the step of enabling the batch mailbox to establish a communication link upon the receipt of further facsimile documents.

26. The method according to claim 23 further comprising the steps of:
   receiving an additional facsimile document in file batch mailbox while the queue busy flag is set;
   queuing the additional facsimile document in the batch mailbox; and
   transmitting tile additional facsimile document to the facsimile machine prior to disconnecting the communication link.

* * * * *